(12) United States Patent  
Pargmann

(10) Patent No.: US 9,052,049 B2
(45) Date of Patent: Jun. 9, 2015

(54) DEVICE FOR OPENING AND CLOSING PIG TRAP DOORS

(75) Inventor: Cory Glenn Pargmann, Cuero, TX (US)

(73) Assignee: SPECTRA ENERGY CORP, Houston, TX (US)

( * ) Notice: Subject to any disclaimer, the term of this patent is extended or adjusted under 35 U.S.C. 154(b) by 540 days.

(21) Appl. No.: 13/419,992

(22) Filed: Mar. 14, 2012

(65) Prior Publication Data

US 2012/0234422 A1  Sep. 20, 2012

Related U.S. Application Data

(60) Provisional application No. 61/452,437, filed on Mar. 14, 2011.

(51) Int. Cl.
*F16L 55/10* (2006.01)
*F16L 55/46* (2006.01)

(52) U.S. Cl.
CPC *F16L 55/10* (2013.01); *F16L 55/46* (2013.01)

(58) Field of Classification Search
USPC .................................................... 138/89, 90
See application file for complete search history.

(56) References Cited

U.S. PATENT DOCUMENTS

| 2,078,003 | A | * | 4/1937 | Klein ............................ 220/325 |
| 2,870,934 | A | * | 1/1959 | Hill ............................... 220/263 |
| 3,548,881 | A | * | 12/1970 | Pavan Amedeo ............... 138/89 |
| 3,756,640 | A | * | 9/1973 | Johnson ................... 292/256.75 |
| 4,237,936 | A | * | 12/1980 | Lollis et al. ...................... 138/90 |
| 4,519,519 | A | * | 5/1985 | Meuschke et al. ............. 220/211 |
| 5,394,650 | A | * | 3/1995 | Dean ............................... 49/386 |
| 6,851,452 | B2 | * | 2/2005 | Smith ............................ 138/89 |
| 7,556,160 | B2 | * | 7/2009 | Porebski et al. .............. 212/179 |
| 7,810,671 | B2 | * | 10/2010 | DePietro ....................... 220/812 |

* cited by examiner

*Primary Examiner* — James Hook
(74) *Attorney, Agent, or Firm* — Jackson Walker L.L.P.

(57) ABSTRACT

A disclosed pig trap door device serves as a tool for opening and/or closing a pig trap door of a pipeline. The pig trap door device may be fixed to a hinge portion of the pig trap door at a hinge attachment and may also be movably coupled to the pig trap door with a force actuator at a door attachment. Operation of the force actuator causes the door attachment to rotate the pig trap door with sufficient torque to seal and/or remove the pig trap door.

11 Claims, 4 Drawing Sheets

DEVICE FOR OPENING AND CLOSING PIG TRAP DOORS

CROSS REFERENCE TO RELATED APPLICATIONS

This application claims priority from U.S. Provisional Patent Application No. 61/452,437, filed on Mar. 14, 2011, entitled "DEVICE FOR OPENING AND CLOSING PIG TRAP DOORS".

BACKGROUND

1. Field of the Disclosure

The present disclosure relates to a pipeline device and, more particularly, to a device for opening and closing pig trap doors.

2. Description of the Related Art

Pigging in the maintenance and/or repair of pipelines may involve using pipeline inspection gauges, referred to as "pigs", to perform various operations within the pipeline, such as measurement, cleaning, and inspection, among others. Pigs may be used while the pipeline product, such as oil and gas, flows through the pipeline. A terminal portion of the pipeline where a pig is introduced and/or removed is referred to as a "pig trap" (also known as a "pig launcher", "pig receiver", "launching trap", "receiving trap", "trap", etc.).

Certain types of pig traps are sealed with a threaded circular rotary-type door, referred to as a "pig trap door", that rotates on a hinged support member anchored to the pipeline. The threads on the pig trap door mate with a threaded end of the pipeline to form a high-pressure seal.

DESCRIPTION OF EXEMPLARY EMBODIMENTS

In the following description, details are set forth by way of example to facilitate discussion of the disclosed subject matter. It should be apparent to a person of ordinary skill in the field, however, that the disclosed embodiments are exemplary and not exhaustive of all possible embodiments.

Disclosed herein is a pig trap door device usable as a tool for opening and closing rotary-type pig trap doors. The pig trap door device may further be configured to precisely apply a relatively large torque for sealing the pig trap door. The pig trap door device may be used safely without application of impact force to the pig trap door. The pig trap door device may further reduce an amount of work involved with opening or closing the pig trap door.

Figure 1:
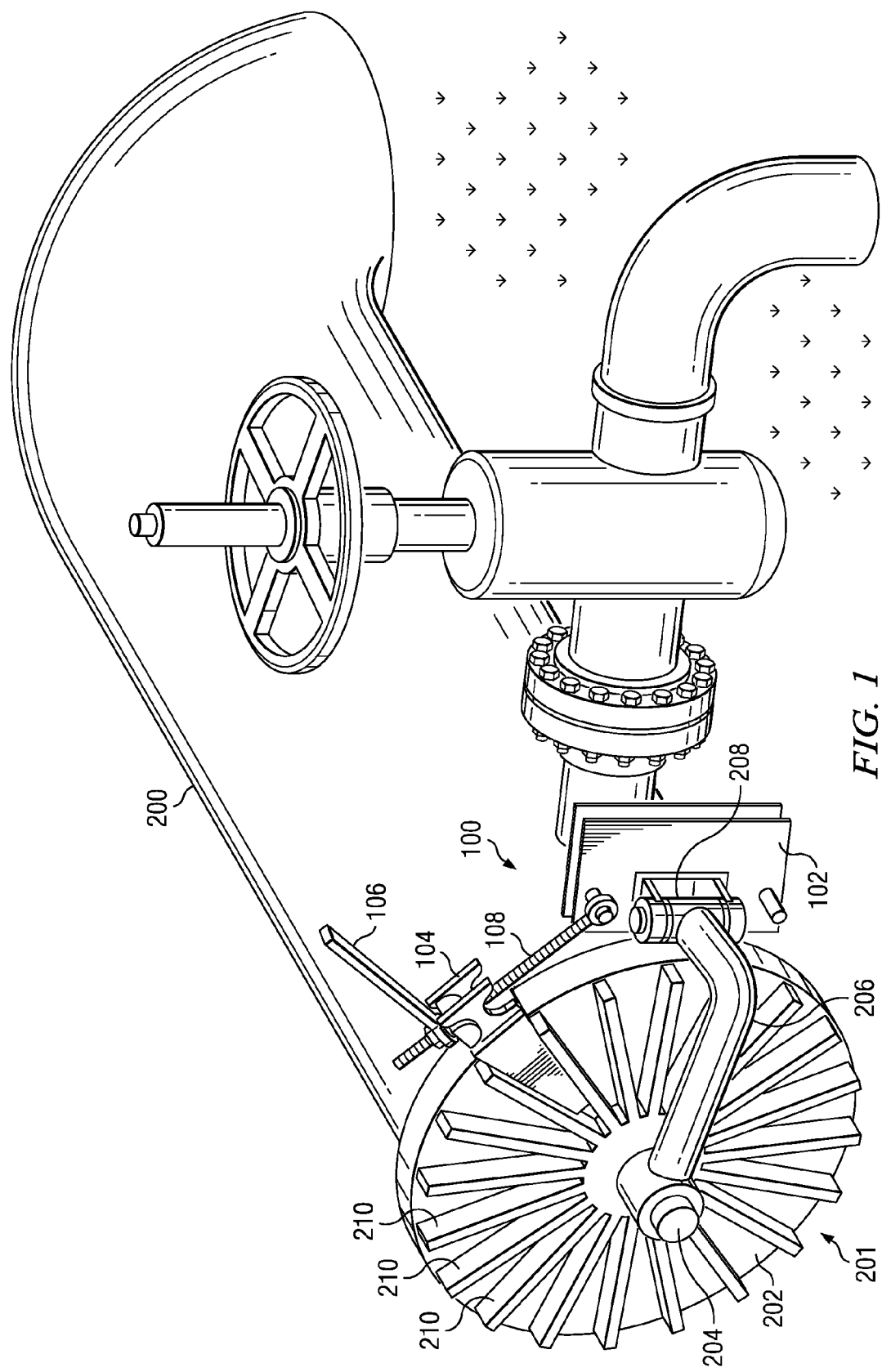
FIG. 1 is an image showing selected elements of an embodiment of a pig trap with a novel device for opening and closing pig trap doors.

Turning now to the drawings, FIG. 1 depicts an image showing selected elements of an embodiment of a pig trap 200 equipped with novel pig trap door device 100. In FIG. 1, pig trap 200 represents a terminal portion of a gas pipeline (obscured from view) that emerges from the ground. Pig trap 200 may provide an inlet or an outlet for introducing or removing a pig (not shown in the figures) into the pipeline. An opening at an end of pig trap 200 for introducing/removing the pig is shown covered by pig trap door assembly 201, which may comprise pig trap door 202, door arm 206, and door hinge 208. Since the pig may operate under pressurized conditions within the pipeline, pig trap door 202 may mate with the end of pig trap 200 to form a high pressure seal.

The high pressure seal may be realized by a threaded pipeline coupling between the end of pig trap 200 and pig trap door 202. It is noted that in the figures, the actual threads of the threaded pipeline coupling securing pig trap door 202 to the end of pig trap 200 are obscured from view. In order to install or remove pig trap door 202, the threaded pipeline coupling may be mated by rotating pig trap door 202 about pivot pin 204, which penetrates door arm 206 to secure pig trap door 202 to door arm 206. Pivot pin 204 therefore represents an axis of rotation about which pig trap door 202 may rotate to engage or disengage the threaded pipeline coupling. When the threaded pipeline coupling is disengaged and pig trap door 202 is mechanically separated from the end of pig trap 200, pig trap door 202, supported by door arm 206, may swing open (not shown in the figures) due to rotation and support provided by door hinge 208. It is noted that while door hinge 208 is shown in a vertical orientation in FIG. 1, other orientations of door hinge 208 may be implemented in different embodiments.

Once pig trap door 202 has been opened using door hinge 208, the pig may be inserted or removed with respect to pig trap 200, as desired. In order to seal pig trap 200, pig trap door 202 may be closed and sealed by rotating about pivot pin 204 to engage the threaded pipeline coupling. Since pig trap door 202 and pig trap 200 may be exposed to a wide range of environmental conditions, such as temperature, pressure, and chemicals, portions of the threaded pipeline coupling may become deformed or corroded during a service lifetime of pig trap 200. This may result in a requirement for relatively high applied torque for sealing or opening pig trap door 202.

Conventionally, pig trap door 202 may be equipped with flanges 210 (also referred to as vanes) configured for receiving an impact force in either a clockwise or counterclockwise direction with respect to pivot pin 204. The impact force may be applied manually with a hammer or similar tool to one or more instances of flanges 210. Such a conventional method of opening and/or closing pig trap door 202 may be time-consuming, dangerous, and may cause damage to pig trap door 202 or other components, thereby shortening a service life of affected components. The impact method of sealing pig trap door 202 may further be highly imprecise for applying a desired torque to the threaded pipeline coupling between pig trap door 202 and the end of pig trap 200.

According to the methods described herein, novel pig trap door device 100 may be introduced to pig trap door assembly 201 for opening and closing pig trap door 202. As will be described in further detail below, pig trap door device 100, which may comprise hinge attachment 102, door attachment 104, and ratchet device 106 that includes threaded rod 108, may enable a smooth and precise operation of the threaded pipeline coupling between pig trap door 202 and the end of pig trap 200. Also, pig trap door device 100 may provide more reliable and expedient operation of the threaded pipeline coupling than the conventional impact force method described above.

Figure 2:
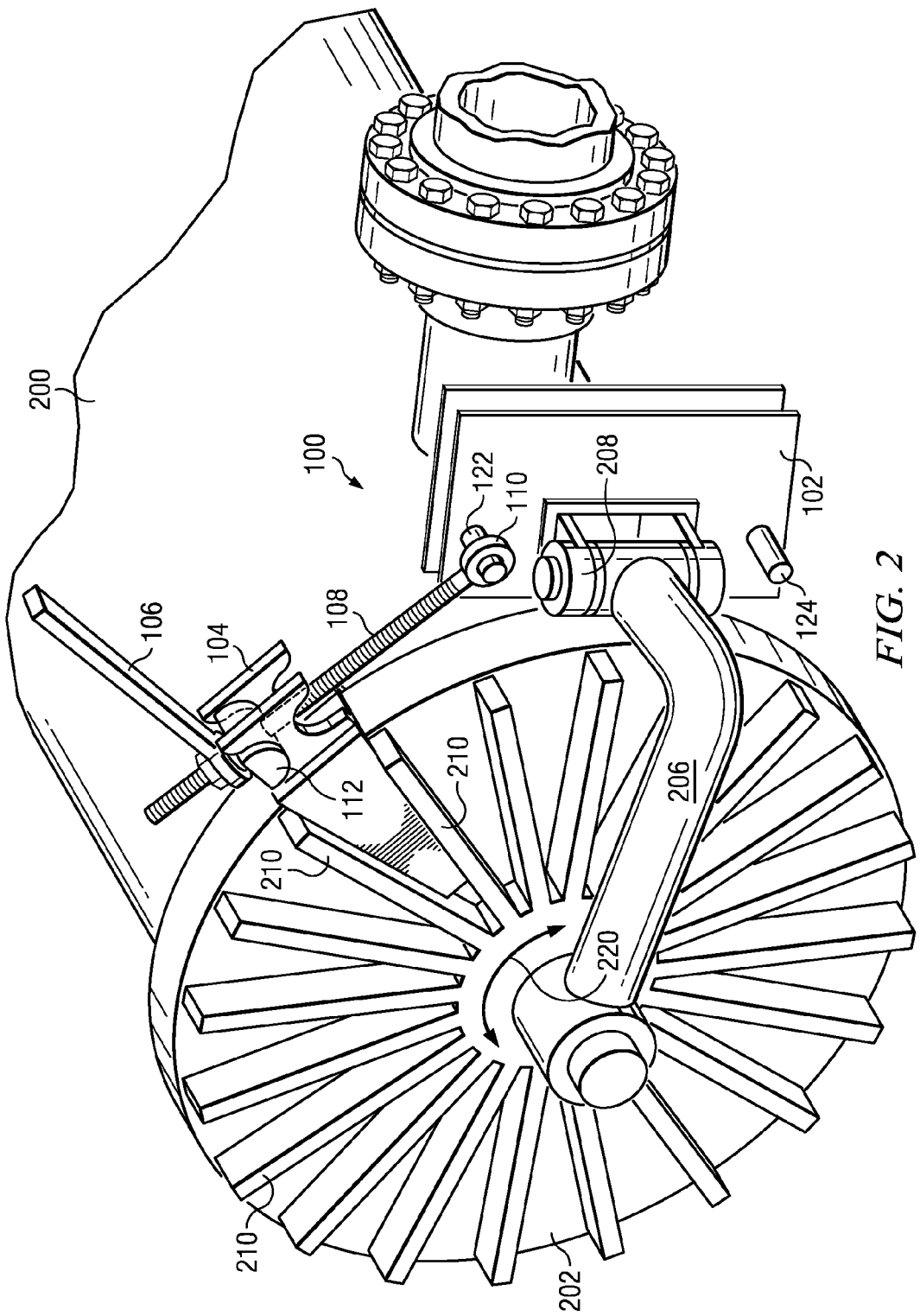
FIG. 2 is an image showing selected elements of an embodiment of a novel device for opening and closing pig trap doors.

Turning now to FIG. 2, an image showing selected elements of an embodiment of pig trap door device 100 is depicted. In FIG. 2, pig trap door device 100 is shown in further detail, while an end portion of door arm 206 that received pivot pin 204 (see FIG. 1) is not shown. In FIG. 2, flanges 210 are visible showing deformation involved with the conventional impact method described above. As in FIG. 1, pig trap door 202 is shown mechanically coupled to an end of pig trap 200 in FIG. 2. As will now be described in detail, pig trap door device 100 may be used to rotate pig trap door 202 in desired angular direction 220.

Pig trap door device 100 may include hinge attachment 102, which may be attached to a mounting bracket of door hinge 208, which may, in turn, receive door arm 206. In other embodiments, hinge attachment 102 may be substituted with another means of anchoring pig trap door device 100 to pig trap 200. Hinge attachment 102 may include mounting post 122 and/or mounting post 124, which may provide for coupling to ratchet device 106 in a number of different orientations. In various embodiments, different numbers and orientations of mounting posts may be included in pig trap door device 100. As shown in FIG. 2, mounting post 122 anchors pig trap door device 100 to pig trap 200 by penetrating bushing 110 at an end portion of threaded rod 108, while mounting post 124 is not in use. Threaded rod 108 extends through a pair of parallel flanges at an end of door attachment 104, which is fixed by a substantially triangular portion that mates precisely between a triangular opening created by two successive flanges 210 of pig trap door 202. In this manner, door attachment 104 provides mechanical coupling to pig trap door 202 and ratchet device 106. It is noted that in various embodiments, other forms, shapes, and configurations of door attachment 104 may be used depending on a particular configuration of pig trap door 202.

In FIG. 2, threaded rod 108 may be held in place by cylindrical element 112, which may or may not be threaded to mate with threaded rod 108. Cylindrical element 112, as shown, is a semi-cylinder that mates on one side with an end portion of door attachment 104 for providing tangential force to pig trap door 202. In various embodiments, cylindrical element 112 may be a cylinder or substantially cylindrical in shape (not shown). It is noted that in FIG. 2, although cylindrical element 112 and ratchet device 106 are mounted in a configuration for sealing pig trap door 202 (i.e., for rotating pig trap door 202 in a clockwise direction), it will be evident that cylindrical element 112 and ratchet device 106 may be mounted in an opposite configuration (i.e., for rotating pig trap door 202 in a counterclockwise direction, not shown) with respect to door attachment 104 on threaded rod 108 for removing pig trap door 202 (i.e., for applying tangential force in an opposite direction as shown in FIG. 2). As shown, cylindrical element 112 is held in place by ratchet device 106 and enables a threaded nut or collar to apply tangential force to door attachment 104 by rotation about threaded rod 108. Ratchet device 106 may represent any one of various types of manual or automatic ratchets for rotating a threaded element about threaded rod 108 in either direction. In certain embodiments, ratchet device 106 may provide an indication of a torque applied to threaded rod 108, which, in turn, may be associated with a given torque with which pig trap door 202 is sealed to pig trap 200.

It is also noted that threaded rod 108, as shown in the exemplary embodiment of pig trap door device 100 shown in FIGS. 1 and 2, is a member in a manual implementation of a linear force actuator, represented by ratchet device 106. In various other embodiments (not shown in the drawings), pig trap door device 100 may include different types of force actuators that may be used to apply force between door attachment 104 and hinge attachment 102 for opening and/or closing pig trap door 202. In certain instances, a linear or a curved force actuator may be included with pig trap door device 100. The force actuator may include an electromechanical device replacing ratchet device 106, for example, such as an electric motor coupled to a mechanism that runs along the threads of threaded rod 108. In another example, pig trap door device 100 may include a hydraulic actuator that mounts, for example, between mounting post 122 and/or mounting post 124 and door attachment 104 to provide controllable force for opening and/or closing pig trap door 202. In yet another example, pig trap door device 100 may include a pneumatic actuator that mounts, for example, between hinge attachment 102 and door attachment 104 to provide controllable force for opening and/or closing pig trap door 202. Other embodiments may include various combinations of mechanical, electromechanical, hydraulic, and/or pneumatic force actuation for use with pig trap door device 100.

In operation, pig trap door device 100 may be mounted as desired for rotation of pig trap door 202. In certain embodiments, pig trap door device 100 may be used for a limited angular rotation of pig trap door 202, for example, in a high torque regime when initially loosening (or finally tightening) the threaded pipeline coupling between pig trap door 202 and the end of pig trap 200. In other embodiments, pig trap door device 100 may be used for a limited angular rotation as permitted by a length of threaded rod 108. Pig trap door device 100 may then be removed and remounted, either entirely or partially, for additional angular rotation in one or more iterations, as desired. Although an example of pig trap door device 100 has been shown with a gas pipeline of a given size, it is noted that in various embodiments, pig trap door device 100 may be implemented for pipelines of various sizes for transporting different products, such as gas, oil, water, or other fluids.

Figure 3:
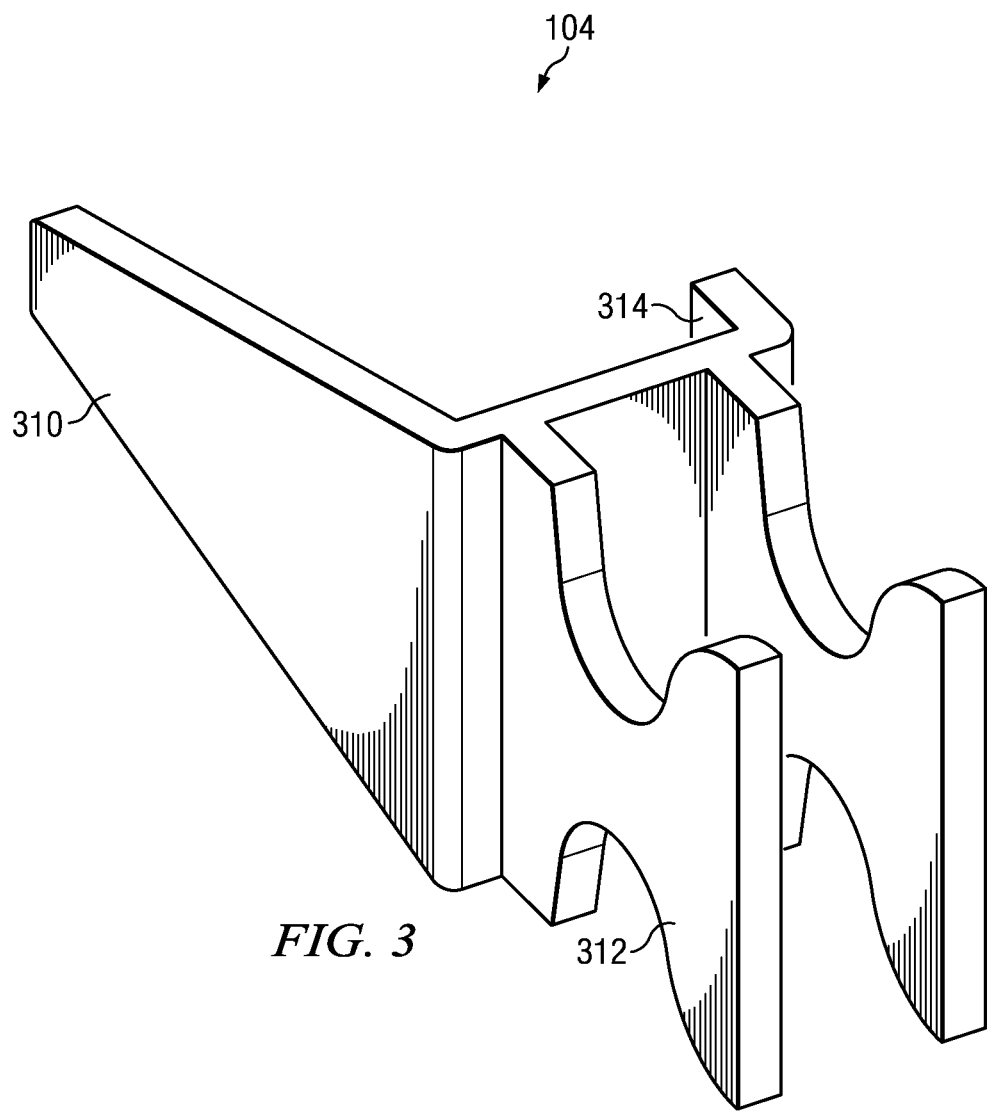
FIG. 3 is an image showing selected elements of an embodiment of a novel device for opening and closing pig trap doors.

Turning now to FIG. 3, a perspective image showing selected elements of an embodiment of door attachment 104 is depicted. As shown in FIG. 3, door attachment 104 may be fabricated using steel plates that are cut as desired and may be welded together. A finishing step, such as painting or other surface treatment, may also be applied to door attachment 104. In FIG. 3, one embodiment of door attachment 104 that has been fabricated using 0.50 inch thick steel plate is depicted. It is noted that door attachment 104 may be implemented in various sizes using different dimensions, as desired. Door attachment 104 is shown comprising vane member 310, which may be shaped in a triangular form to fit between an angle subtended by two adjacent flanges or vanes 210 (see FIG. 2). A length and angular extent of vane member 310 may be implemented to correspond to a particular embodiment of pig trap door assembly 201 (see FIG. 1). Door attachment 104 is also shown having support member 314, which may secure door attachment 104 to pig trap door assembly 201 and prevent slippage or unwanted movement during operation.

Also shown in FIG. 3 included with door attachment 104 are two substantially identical fastening plates 312, which are configured to receive cylindrical element 112 coupled to threaded rod 108 (see FIG. 2), as described previously. It is noted that, although fastening plates 312 are shown herein with a circular opening for receiving cylindrical element 112, cylindrical element 112 may be replaced with another form, such as square, rectangular, triangular, oval, etc., that may be mirrored in the form of fastening plates 312. An opening between fastening plates 312, as well as symmetry in the shape of fastening plates 312, may allow threaded rod 108 to pass through for installation with cylindrical element 112 on either side (i.e., either for tightening or loosening pig trap door assembly 201).

Figure 4:
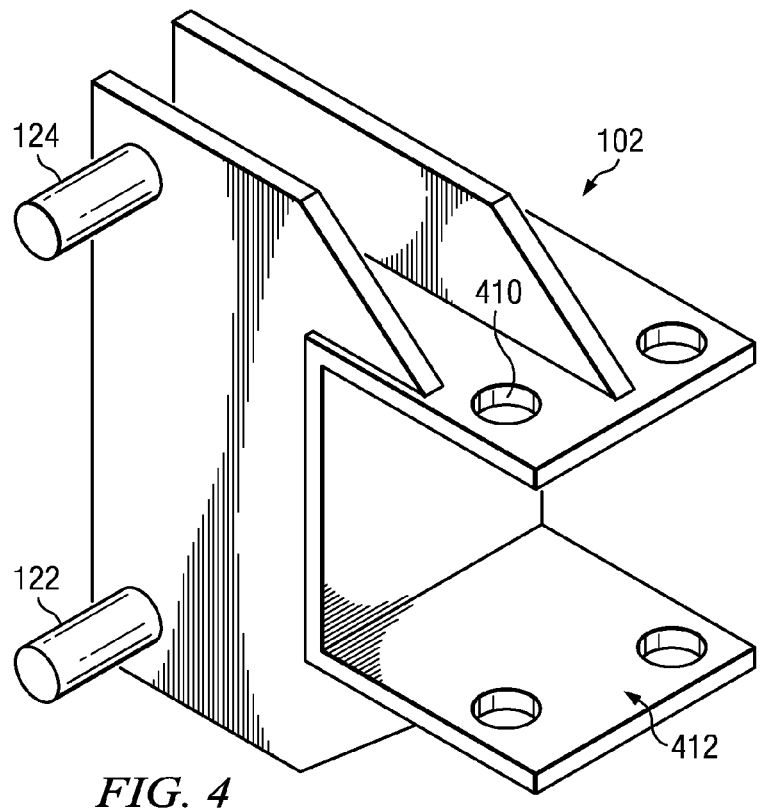
FIG. 4 is an image showing selected elements of an embodiment of a novel device for opening and closing pig trap doors.

Turning now to FIG. 4, a perspective image showing selected elements of an embodiment of hinge attachment 102 is depicted. In FIG. 4, one embodiment of hinge attachment 102 that has been fabricated using 0.50 inch thick steel plate and substantially identical mounting posts 122, 124 having 1.31 inch diameter is depicted. It is noted that hinge attachment 102 may be implemented in various sizes using different dimensions, as desired. Hinge attachment 102, as noted previously, may be mounted to a mounting bracket of door hinge 208 at mounting holes 410, which are now visible in the perspective view of FIG. 4, but were previously obscured from view in FIGS. 1 and 2. As shown in FIG. 4, hinge attachment 102 is formed with hinge opening 412, which may fit around a member of door hinge 208 (see FIG. 2). Also visible in FIG. 4 are mounting post 122 and mounting post 124, as described previously.

Figure 5:
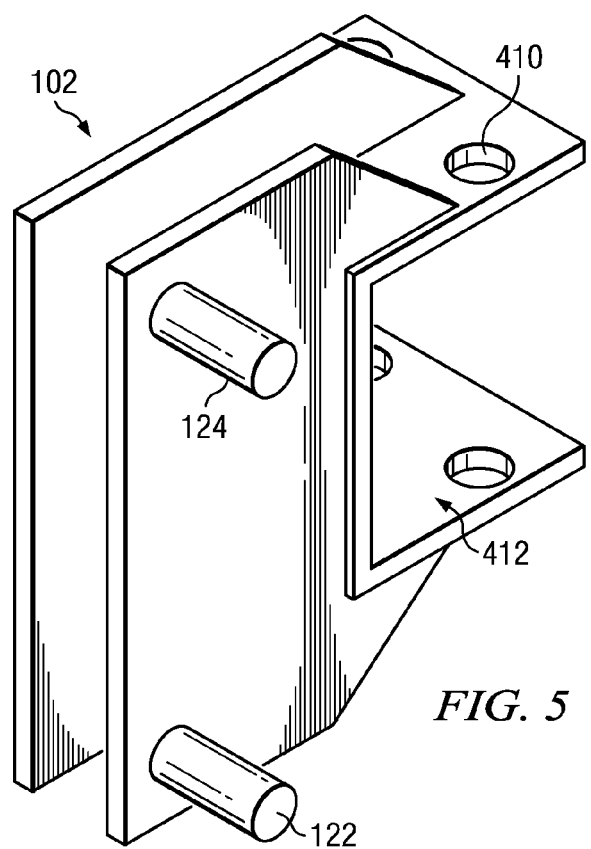
FIG. 5 is an image showing selected elements of an embodiment of a novel device for opening and closing pig trap doors.

Turning now to FIG. 5, another perspective image showing selected elements of an embodiment of hinge attachment 102 is depicted. It is noted that like numbered elements in FIG. 5 represent components discussed above with respect to FIG. 4.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A pig trap door device comprising:
   a hinge attachment configured for mounting to a stationary portion of a pig trap of a pipeline;
   a door attachment configured for mounting to a pig trap door of the pig trap, wherein the pig trap door rotates with respect to the pig trap for opening and closing; and
   a ratchet device that couples to the hinge attachment and the door attachment, wherein the ratchet device includes a linear force member;
   wherein the door attachment includes a shaped portion configured to mate with an open fixture of the pig trap door; and
   wherein the shaped portion of the door attachment is substantially triangular in shape, and wherein the open fixture of the pig trap door is a triangular opening created by two adjacent flanges of the pig trap door.

2. The pig trap door device of claim 1, wherein the hinge attachment is configured for bolting to a portion of a door hinge supporting the pig trap door.

3. The pig trap door device of claim 1, wherein the hinge attachment includes mounting posts for receiving an end portion of the ratchet device.

4. The pig trap door device of claim 3, wherein the end portion of the ratchet device is a bushing that mates with the mounting posts.

5. The pig trap door device of claim 1, wherein the door attachment includes two parallel plates between which the linear force member may be placed.

6. The pig trap door device of claim 5, wherein the two parallel plates are configured to mate with a retaining element to apply force between the ratchet device and the door attachment.

7. The pig trap door device of claim 6, wherein the retaining element is cylindrical in shape.

8. The pig trap door device of claim 6, wherein the linear force member is a threaded rod, and wherein the ratchet device includes a threaded collar configured for threading to the threaded rod.

9. The pig trap door device of claim 1, wherein the ratchet device is configured to apply a force against the door attachment to open the pig trap door.

10. The pig trap door device of claim 1, wherein the ratchet device is configured to apply a force against the door attachment to close the pig trap door.

11. The pig trap door device of claim 10, wherein the force to close the pig trap door is a predetermined value.

* * * * *